US012413261B2

(12) United States Patent
Li et al.

(10) Patent No.: US 12,413,261 B2
(45) Date of Patent: Sep. 9, 2025

(54) NEAR-END CROSSTALK CANCELLATION SYSTEM

(71) Applicant: Intel Corporation, Santa Clara, CA (US)

(72) Inventors: Jingbo Li, Portland, OR (US); Beom-Taek Lee, Beaverton, OR (US); Jong-Ru Guo, Portland, OR (US); Yunhui Chu, Hillsboro, OR (US); Chunfei Ye, Lacey, WA (US); Kai Xiao, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 823 days.

(21) Appl. No.: 17/463,976

(22) Filed: Sep. 1, 2021

(65) Prior Publication Data

US 2021/0399764 A1 Dec. 23, 2021

(51) Int. Cl.
*H04B 3/32* (2006.01)
*H04B 3/462* (2015.01)
*H04B 3/487* (2015.01)

(52) U.S. Cl.
CPC ............ *H04B 3/32* (2013.01); *H04B 3/462* (2013.01); *H04B 3/487* (2015.01)

(58) Field of Classification Search
CPC .......... H04B 3/32; H04B 3/462; H04B 3/487
USPC ................................................ 370/201–210
See application file for complete search history.

(56) References Cited

U.S. PATENT DOCUMENTS

| 6,934,387 | B1* | 8/2005 | Kim | H04B 3/32 |
| | | | | 379/406.01 |
| 2001/0019581 | A1 | 9/2001 | Agazzi | |
| 2005/0013353 | A1* | 1/2005 | Alloin | H04M 3/34 |
| | | | | 375/222 |
| 2006/0159002 | A1* | 7/2006 | Kim | H04B 3/32 |
| | | | | 370/201 |
| 2007/0064923 | A1* | 3/2007 | Schmukler | H04B 3/32 |
| | | | | 379/406.1 |
| 2009/0080325 | A1* | 3/2009 | Parnaby | H04B 3/32 |
| | | | | 370/201 |
| 2010/0135372 | A1* | 6/2010 | Agazzi | H04L 25/03057 |
| | | | | 375/346 |
| 2011/0069604 | A1* | 3/2011 | Schmukler | H03H 11/265 |
| | | | | 370/201 |
| 2011/0136372 | A1* | 6/2011 | Heckmann | H01R 13/6466 |
| | | | | 439/540.1 |

(Continued)

FOREIGN PATENT DOCUMENTS

GB      2161345 A      1/1986

OTHER PUBLICATIONS

EPO; Extended European Search Report issued in EP Patent Application No. 22188170.9, dated Jan. 17, 2023; 10 pages.

(Continued)

*Primary Examiner* — Candal Elpenord
(74) *Attorney, Agent, or Firm* — Alliance IP, LLC

(57) ABSTRACT

An apparatus comprises a crosstalk cancelation circuit comprising a plurality of taps to output signals based on a signal transmitted via a first data line; and a summation circuit to combine a signal received by a second data line with the signals output by the plurality of taps to reduce near-end crosstalk present in the signal received by the second data line.

17 Claims, 8 Drawing Sheets

(56) References Cited

U.S. PATENT DOCUMENTS

2015/0207635 A1\* 7/2015 Tu .......................... H04B 3/32
370/311

OTHER PUBLICATIONS

Gi-Hong Im and N. R. Shanbhag, "A pipelined adaptive NEXT canceller," in IEEE Transactions on Signal Processing, vol. 46, No. 8, pp. 2252-2258, Aug. 1998, doi: 10.1109/78.705453.

EPO European Extended Search Report in EP Application Serial No. 22188170.9 mailed on May 16, 2024, 5 pages.

Horowitz, Mark; "FIR Design and Decision Feedback Equalization," Computer Systems Laboratory Stanford University, Stanford, CA; 2007, 18 pages.

\* cited by examiner

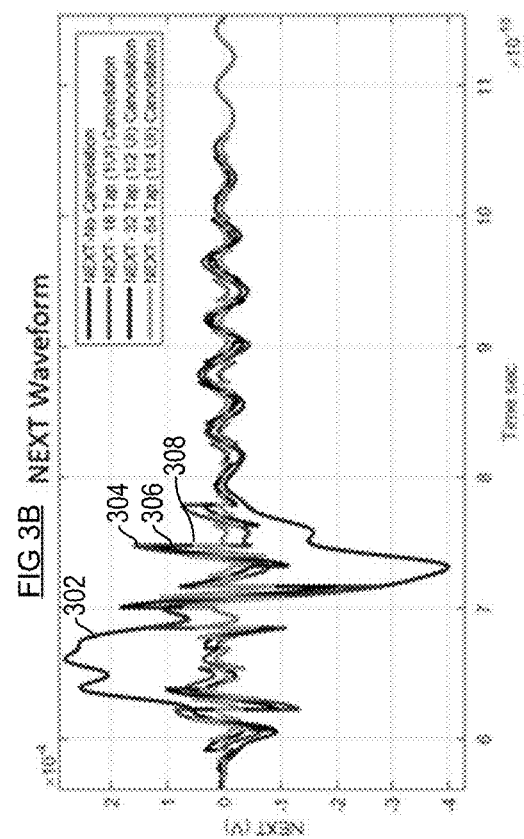
FIG. 3A PCIe Channel
FIG. 3B NEXT Waveform
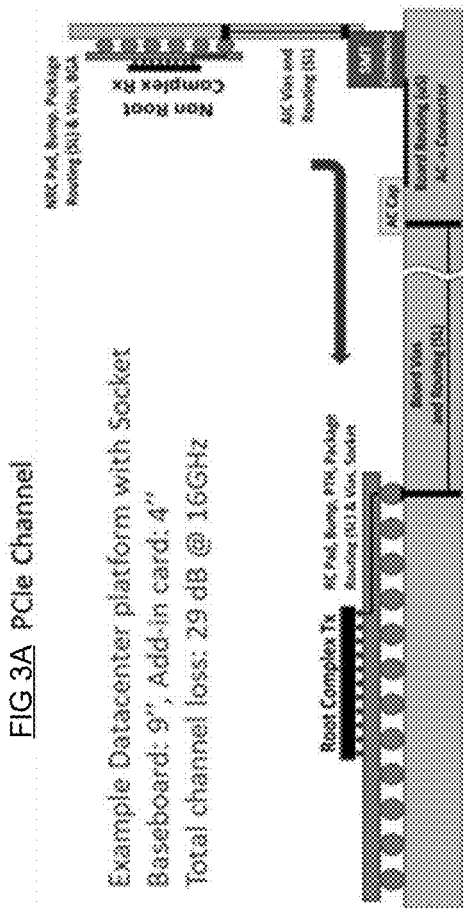
FIG. 3C EH (V)
FIG. 3D EW (UI)

NEAR-END CROSSTALK CANCELLATION SYSTEM

BACKGROUND

A computer system may include various components that communicate with each other over communication channels. Such components may include, for example, one or more central processing units (CPUs), storage devices, memory devices, or other input/output devices. Near-end crosstalk (NEXT) may cause performance degradation in high-speed signaling between components, especially when the crosstalk source or coupling point (e.g., a socket) is close to both the receiver and transmitter that are operating simultaneously.

BRIEF DESCRIPTION OF THE DRAWINGS

FIGS. 3A-3D illustrates an example Peripheral Component Interconnect Express (PCIe) channel and NEXT characteristics in accordance with certain embodiments.

Like reference numbers and designations in the various drawings indicate like elements.

DETAILED DESCRIPTION

Figure 1:
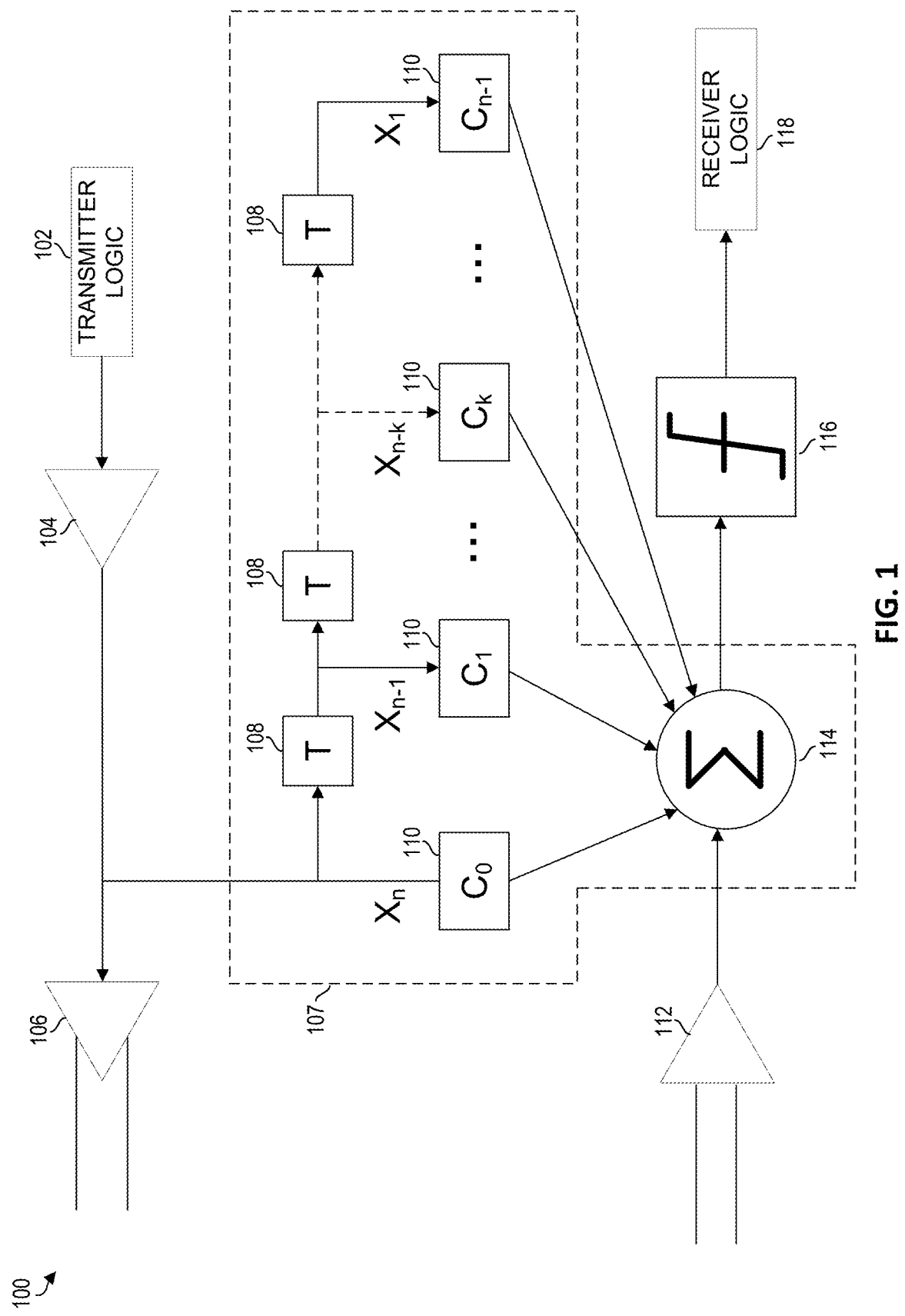
FIG. 1 illustrates a near-end crosstalk (NEXT) cancellation system in accordance with certain embodiments.

FIG. 1 illustrates a near-end crosstalk cancellation (NXC) system 100 in accordance with certain embodiments. System 100 includes transmitter logic 102; drivers 104, 106, and 112; an NXC circuit 107 comprising delay blocks 108, gain blocks 110, and summation circuit 114; sampler 116, and receiver logic 118. The data line that is driven by drivers 104 and 106 may be an aggressor data line that is the source of crosstalk on a victim data line that is coupled to driver 112. In various embodiments, the data lines (or portions thereof) may be single ended or differential pairs. A data line may comprise any suitable path to conduct a signal. For example, such a path may include conductive traces, bonding pads, pins, or other suitable elements.

High bandwidth over communication channels is an important aspect of a high performance system. Crosstalk may be caused, e.g., by capacitive, inductive, or conductive coupling between an aggressor data line and a victim data line. The crosstalk may result in a distortion of a signal transmitted over the victim data line due to interference from a signal transmitted over the aggressor data line.

In a near-end crosstalk (NEXT) coupling case, the aggressor and victim signals are typically signals transmitted or received by the same device. Moreover, they are often transmitting and receiving signals of the same I/O interface, or even of the same port of the same I/O interface. In various embodiments of the present disclosure, a feedback loop between a transmitter and a receiver (or between multiple transmitters and receivers) may be provided within a device to compensate for a NEXT effect. The feedback loop may reduce the NEXT from a given source with a compensation signal, which is driven by the same logic input as the aggressor data line. Due to NEXT behaving as a linear time-invariant (LTI) system, the compensation signal is automatically adapted to the NEXT generated by the arbitrary aggressor signal.

Various embodiments provide a flexible, practical, and effective method to cancel NEXT and hence boost channel performance. The techniques described herein may be applied to both differential (e.g., as shown in FIG. 1 as the output of driver 106) and single-ended (not shown) interfaces. Embodiments described herein may provide one or more technical advantages, such as improved channel performance (e.g., better channel margins, higher speeds, less errors), flexibility and scalability (e.g., when higher circuit complexity is affordable, the NEXT cancellation may be more sophisticated, thus allowing a trade-off between circuitry complexity and performance), and practical implementation ability.

In the embodiment depicted, the data line coupled to the transmitter logic 102 is the aggressor data line and the data line coupled to receiver logic 118 is the victim data line. Transmitter logic 102 includes any suitable transmission logic to generate a data sequence to be transmitted over the aggressor channel. The data sequence is passed to driver 104. In some embodiments, driver 104 comprises a digital-to-analog converter to generate a waveform based on the digital sequence provided by the transmitter logic 102.

The output of driver 102 is provided to the driver 106 for transmission across the data line. In general, the driver 106 may be any type of driver that is suitable to transmit a signal across the data line at an acceptable bandwidth. In one example, driver 106 is a voltage-mode driver. In another example, driver 106 is a current-mode driver. Drivers 104 and 106 may may have any suitable characteristics such as configurable equalization capabilities (e.g., for example, a driver may comprise multiple taps that may be used to adjust equalization performed on the signal transmitted over the data line).

The waveform output by driver 104 on the aggressor data line is provided as an input to the NXC circuit 107. The NXC circuit 107 generates a compensation signal using a plurality of taps comprising delay blocks 108 and gain blocks 110, where a tap may comprise a delay block and the gain block coupled to the output of the delay block or just a gain block (e.g., in the case of the gain block with coefficient $C_0$).

A delay block 108 may comprise circuitry (e.g., one or more delay lines) to delay an input waveform to the delay block by some amount of time. Thus, the waveform input to a second gain block 110 (with coefficient $C_1$) will be delayed relative to the waveform input to a first gain block 110 (with coefficient $C_0$) that is connected to the data line without an intervening delay block, the waveform input to a third gain block 110 (with coefficient $C_2$) will be delayed relative to the waveform input to the second gain block 110 (with coefficient $C_1$), and so on.

In various embodiments, a delay block 108 may provide a time delay of a whole unit interval (UI) or a fraction of a UI (a sub-UI), such as ½ UI, ⅓ UI, ¼ UI, etc. Sub-UI delays may be implemented, e.g., by splitting a clock used to generate the waveform transmitted over the aggressor data line. In one embodiment, each delay block 108 introduces the same amount of delay to its input waveform (e.g., each delay block 108 introduces a UI delay, each delay block 108 introduces a ½ UI delay, or each delay block 108 introduces a ⅓ UI delay, etc.). In other embodiments, the delay introduced by a delay block 108 may be different from the delay introduced by one or more other delay blocks 108. In many situations, an embodiment wherein each delay block introduces a whole UI delay may be able to cancel the majority of the NEXT. However, embodiments wherein each delay block introduces a fraction of a UI delay (and there are more delay blocks 108) may apply additional NEXT cancellation and may be used if sufficient budget is available.

A gain block 110 may comprise circuitry to attenuate or amplify a waveform. The coefficient (e.g., $C_0$, $C_1$, etc.) of a gain block may represent a scaling factor. For example, if the coefficient is 0.5, the output waveform may have half of the amplitude of the input waveform, whereas if the coefficient is 1.7, the output waveform may have 1.7× the amplitude of the input waveform. The gain block 110 may comprise a multiplier circuit in which the coefficient is a multiplier applied to the input waveform to the gain block 110. As the NEXT amplitude may vary as a function of time, the coefficients may be set to different values to achieve efficient NEXT cancelation. The setting of the coefficient values are described in more detail below.

Summation circuit 114 combines the waveforms output by the taps (e.g., via the gain blocks 110) and a waveform received on the victim data line that is eventually coupled to the receiver logic 118. The received signal may pass through driver 112 before being supplied to the summation circuit 114. The collective outputs of the gain blocks 110 when summed together represent a crosstalk compensation signal. The crosstalk compensation signal may be expressed as:

$$C(t) = \sum_{k=0}^{n-1} C_k X(t - k*T) \quad \text{Equation 1}$$

where X is the sequence transmitted by the aggressor data line's driver 104 (e.g., I/O buffer), $C_k$ (k=0, 1, 2, ... n−1) are the gain coefficients of the gain blocks 110, T is the delay of each delay block 108, and n is the total number of taps (e.g., delay block 108 and gain block 110 pairs plus the initial gain block having coefficient $C_0$).

The crosstalk compensation signal is added to the received waveform from driver 112 to remove at least a portion of the crosstalk caused by the aggressor data line from the received waveform. The compensated signal is then sampled by sampler 116. The sampler may periodically sample the waveform and determine a voltage level of the waveform as a function of time. The sampler could resolve the signal to a high voltage or a low voltage (e.g., when Non-Return-to-Zero (NRZ) signaling is used) or to any number of voltages (e.g., to four voltage levels when Pulse Amplitude Modulation 4-level (PAM4) signaling is used). The sampling results are then provided to the receiver logic 118 which may constitute any suitable receiver logic 118 for recovering data sent over the victim data line.

In systems in which multiple aggressor data lines are present, multiple instances of NXC circuit 107 may be implemented, wherein each instance of an NXC circuit 107 receives an input waveform from a different aggressor channel and provides its outputs from the gain blocks 110 to the same summation circuit 114 (such that multiple crosstalk compensation signals are added to the received waveform on the victim data line by the summation circuit 114).

The effectiveness of the NXC circuit 107 depends heavily on the selection of the coefficients for the gain blocks 110. In various embodiments, the coefficients may be estimated (e.g., set using characteristics of the channels), directly calculated, or dynamically trained. The coefficients may be set in any suitable manner, such as through writing one or more registers with the values of the coefficients (e.g., through a firmware operation).

The coefficients of the gain blocks 110 may be set in any suitable manner. In one embodiment, the coefficients are preset (e.g., at the time of design, manufacturing, or testing) based on characteristics of the channels. For example, the dominant NEXT sources may include the package, socket, and connector. The location of these NEXT sources and their crosstalk levels may be determined by the device designers, e.g., based on pre-silicon simulations or post-silicon measurements, and may be used to determine the optimal coefficients for the gain blocks 110. Once set, these coefficients may remain unchanged during the link operation. Consequently, the pre-set tap coefficients do not interact with link training. Such embodiments may simplify the complexity of the design of the NXC circuit 107.

In some embodiments, the coefficients may be directly calculated, e.g., using simulation or an on-die scope (or similar circuitry) that is able to capture a waveform as a function of time. During direct calculation, a waveform captured by an on-die scope may be split into sections based on time (e.g., one section per UI or one section per length of delay provided by each delay block 108, e.g., ½ UI, ⅓ UI, etc.) and for each section, the coefficient value that best cancels out the crosstalk for that time period is set. A direct calculation of the coefficients may assume that the amplitude (e.g., average or center) of the near-end crosstalk from a single pulse excitation may be obtained per section of the waveform.

Figure 8B:
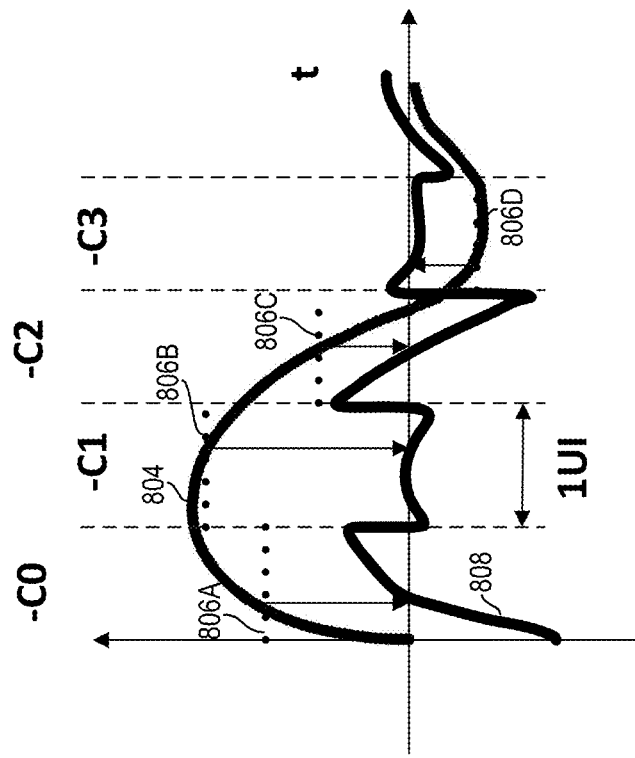
FIGS. 8A and 8B illustrate waveforms associated with coefficient determination in accordance with various embodiments.
Figure 8A:
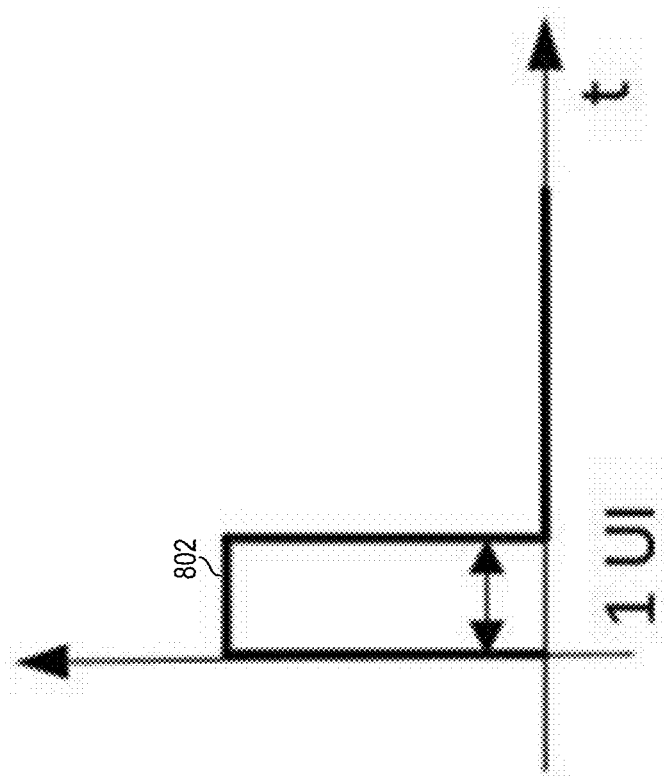

FIGS. 8A-8B illustrate an example direct calculation of coefficients. These FIGS. assume that each section of the waveform is 1 UI. As depicted in FIG. 8A, a single pulse excitation 802 may be applied on the aggressor data line. FIG. 8A illustrates the resultant NEXT waveform that may appear on the victim data line (e.g., the waveform may be obtained via either simulation or an on-die scope).

The observed NEXT is depicted by waveform 804. Coefficient values C0 through C4 are set to the opposite values of the average NEXT values (dashed lines 806) for each UI. Waveform 808 depicts the waveform resulting from the same pulse 802 after the NEXT cancellation with these coefficient values have been applied. If the channel is linear and satisfies the superposition theorem, the coefficient values that minimize the NEXT due to a pulse excitation may also minimize the NEXT due to excitations having any suitable shapes.

In yet other embodiments, the coefficients may be calculated through a training sequence. An example, of such a sequence is described below in connection with FIG. 2.

Figure 2:
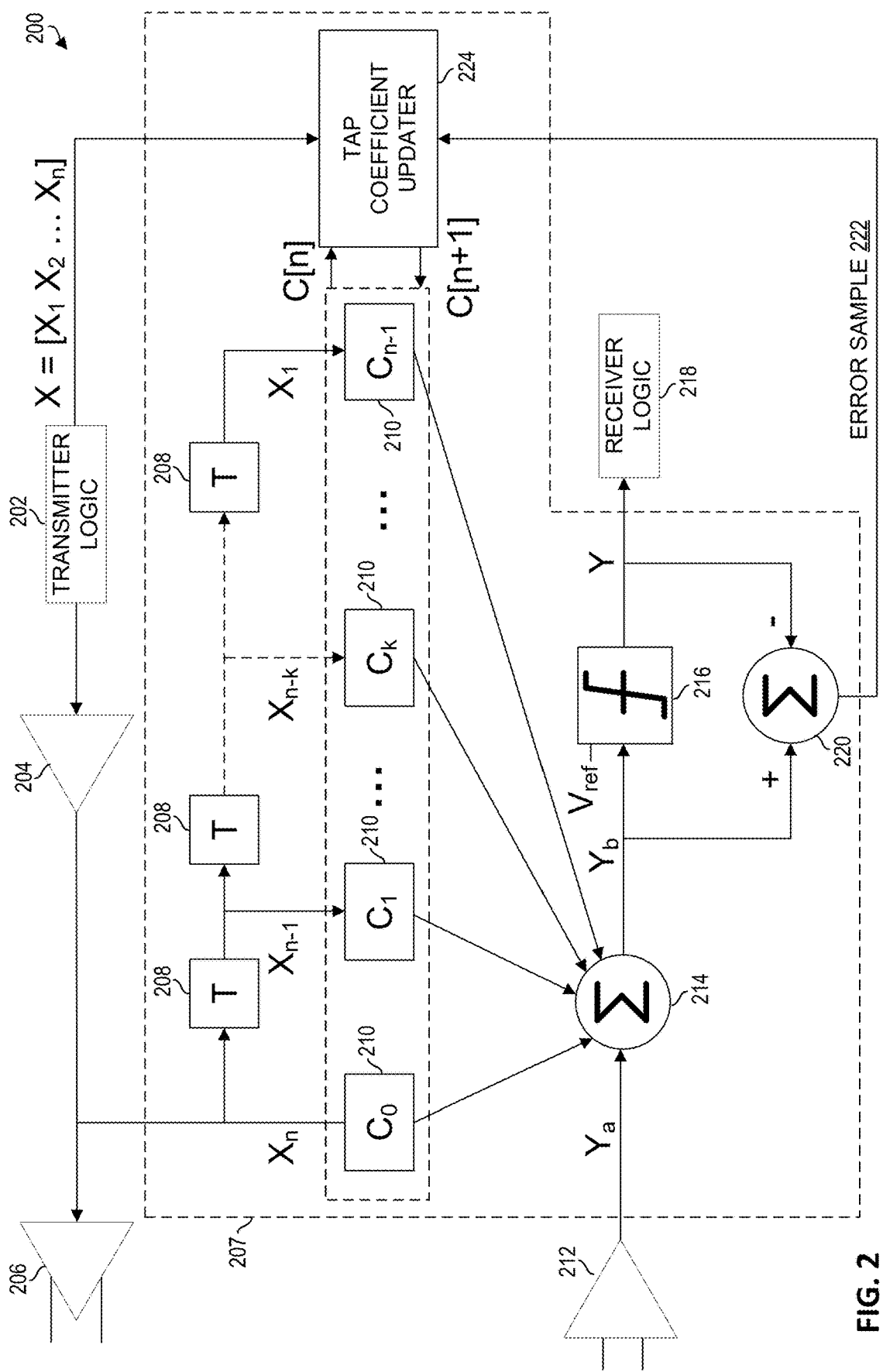
FIG. 2 illustrates a NEXT cancellation system with training capabilities in accordance with certain embodiments.

FIG. 2 illustrates a near-end crosstalk cancellation system 200 with coefficient training capabilities in accordance with certain embodiments. In various embodiments, receiver adaptation may be implemented to set the coefficient values. Although in various embodiments the adaptation may be implemented using any suitable techniques, the training sequences described below are based on a least-mean-square (LMS) approach.

System 200 includes transmitter logic 202; drivers 204, 206, and 212; an NXC circuit 207 comprising delay blocks 208, gain blocks 210, summation circuit 214, sampler 216, difference circuit 220, and tap coefficient updater 224; and receiver logic 218. Components of FIG. 2 may have any one or more of the characteristics of similar components of FIG. 1.

The sequence of values X (e.g., digital values) that are transmitted on the aggressor data line are provided by the transmitter logic 202 to the tap coefficient updater 224. As depicted, this sequence shows that $X_1$ is transmitted first, followed by $X_2$, and so on until $X_n$ is transmitted.

As in system 100, the outputs of each gain block 210 are provided to a summation circuit 214. The summation circuit 214 combines these outputs with a received signal $Y_a$ on the victim data line. The output of the summation circuit $Y_b$ (representing the compensated received signal) is then provided to a sampler 216 as well as a difference circuit 220. The difference circuit 220 outputs error sample 222 which represents the difference between the signal $Y_b$ input into the sampler 216 and the output signal Y of the sampler 216. In the ideal case, the sampled signal $Y_b$ will be equal to the $V_{ref}$ value provided as a reference value to the sampler 216. As one example, for detected high voltage levels (e.g., +1), the sampler 216 may output $+V_{ref}$, while for detected low voltage levels (e.g., −1), the sampler 216 may output $-V_{ref}$. Thus, the error sample 222 represents the variance between the actual compensated received signal $Y_b$ and the ideal compensated received signal. In other embodiments, one or more additional reference voltages may be used (depending on the type of signaling implemented).

Knowledge of the error sample 222 and the input signal X allows the tap coefficient updater 224 to update the set of coefficients $C_0$ through $C_{n-1}$. Example methods for updating the coefficients are described below.

The output of the summation circuit 214 ($Y_b$) may be expressed as:

$$Y_b = Y_a + \sum_{k=0}^{n-1} C_k X_{n-k} \qquad \text{Equation 2}$$

where, as described above, X is the transmitted sequence X=[X1 X2 ... Xn] at the aggressor channel, $C_k$ is the tap coefficient, K=0, 1, ... n−1 for n taps (e.g., gain blocks 210), and $Y_a$ is the received signal before the compensation.

The error sample 222 (E) can be defined by:

$$E = Y_b - Y = Y_a - Y + \sum_{k=0}^{n-1} C_k X_{n-k} \qquad \text{Equation 3}$$

In this embodiment, a LMS approach may be applied to minimize the square of the error E, where the square is expressed as:

$$E^2 = (Y_b - Y)^2 = \left(Y_a - Y + \sum_{k=0}^{n-1} C_k X_{n-k}\right)^2 \qquad \text{Equation 4}$$

For each coefficient value $C_k$, the adaptation is along the gradient of $E^2$, until convergence at the global minima. The gradient may be calculated as:

$$\frac{\partial E^2}{\partial C_k} = 2 * E * \frac{\partial E}{\partial C_k} = 2 * E * X_{n-k} \qquad \text{Equation 5}$$

where $X_{n-k}$ is equal to $$\frac{\partial E}{\partial C_k}$$

based on Equation 3 as the other terms on the right side of the equation are independent of $C_k$.

Thus, the adaptation of $C_k$ may be updated by:

$$C_k[n+1] = C_k[n] - u * E[n] * X_{n-k} \qquad \text{Equation 6}$$

where u is a scaling factor to control the step size (or time of convergence) during the adaptation.

In another embodiment, a sign-sign LMS approach may be used to update the coefficients. In some embodiments, a sign-sign LMS approach may utilize less register space relative to the LMS approach (e.g., since a value for a sign may utilize a single bit register whereas a value for the error sample or a value of X may utilize multiple bit registers). In one embodiment utilizing a sign-sign LMS approach, Equation 6 may be modified as follows:

$$C_k[n+1] = C_k[n] - u * \text{sign}(E[n]) * \text{sign}(X_{n-k}) \qquad \text{Equation 7}$$

In various embodiments, Equation 6 or 7 (or other suitable update equation) may be implemented by the tap coefficient updater 224 to update each tap coefficient ($C_k$), until the error sample 222 converges to a global minima of $E^2$.

Thus, a coefficient $C_k$ for a gain block 210 (where k is the number of the tap) may be dynamically updated according to either of the equations above or other suitable training sequences. During an update iteration (e.g., for a UI) a coefficient $C_k$ may be updated based on the current value of the coefficient $C_k$, a transmitted signal (e.g., the value transmitted at a time based on the number (k) of the coefficient), and the error sample 222. During an update iteration, each coefficient $C_k$ of the gain blocks 210 may be updated together as the tap coefficient updater has access to the current coefficient values C[n] and outputs the updated coefficient values C[n+1].

The equations (or other adaptation methodologies) may be adapted when the delay is a fraction of a UI. In various such embodiments, the sampler 216 may sample the data at the sub-UI interval. Consequently, the $X_{n-k}$ term in the equations may also represent the transmitted data at the sub-UI interval (thus a transmitted bit at a particular UI will be used multiple times in the equation).

In various embodiments, the tap coefficient updater 224 updates the coefficients for a predetermined amount of time (e.g., a particular number of UIs) until the coefficients converge to their ideal values (or to values close to their ideal values). In another embodiment, the tap coefficient updater 224 may update the coefficients until other criteria has been reached (e.g., the error sample 222 is below a threshold for one or more update iterations, the change in value of one or more coefficients is below a threshold, or other suitable criteria). Once the tap coefficient updater 224 has completed an update sequence, the coefficient values may remain fixed as the link operates. Thus, in some embodiments, circuitry of the tap coefficient updater 224 may be disabled after the update sequence is completed in order to save energy.

In general, the NEXT signal may arrive on the receiver data line with a delay. Therefore, a delay adjustment circuit (or the tap coefficient updater 224) may be utilized to align the compensation signal with the NEXT signal. This may be achieved in some embodiments by setting the coefficient values for the beginning X number of taps to 0 (e.g., when the NEXT delay is roughly equal to X*T, where T is the delay through each delay block). In other embodiments, the delay may be achieved with other delay circuitry having the required resolution placed before the waveform on the aggressor data line is passed to the NXT cancellation circuitry.

Various crosstalk cancellation techniques described herein may share some similarities with decision feedback equalization (DFE) techniques, but there are numerous distinctions between the techniques. For example, in DFE adaptation, the error term is generally defined by $Y_a-Y$, instead of $Y_b-Y$. Moreover, $Y_{n-k}$ (rather than $X_{n-k}$) is used to update the tap coefficient, thus DFE does not use the waveform pattern of the aggressor data line. In at least some NXC techniques described herein, continuous training during link operation is not required, in contrast to DFE techniques. Once adapted to their optimal values, the tap coefficients ($C_k$) can remain fixed (as NEXT generally does not vary much for a fixed system).

In at least some embodiments, the NXC circuit may improve the signal on the victim data line, including both the current and post-cursor symbols (whereas DFE techniques only improve post-cursor symbols).

Additionally, DFE's input and output are both on the same channel and DFE is used for improving inter symbol interference (ISI), rather than NEXT. Because the NEXT noise (compensated by an NXC circuit) is independent of the channel ISI noise (compensated by DFE), the two compensation mechanisms can co-exist and be performed simultaneously during the initial link training without interfering with each other.

FIGS. 3A-3D illustrates an example PCIe channel and NEXT characteristics in accordance with certain embodiments. FIG. 3A illustrates an example PCIe channel between a root complex transmitter (tx) and a non root complex receiver (rx) on a data center platform, which may contain one or more sockets. In general, the socket and package may be the dominant source for NEXT. The channel also contains a baseboard and an add-in card, which forms a common one-connector topology. In the example channel, the length of the baseboard is set to 9 inches and the length of the add-in card is set to 4 inches, which may result in a simulated total channel loss of −29 dB at 16 GHz. FIGS. 3B-3D represent results of a simulation conducted for PCIe 6.0 speed at 64 Gbps with PAM4 signaling. The transceiver characteristics used in the simulation conform with the PCIe 6.0 specification.

In various embodiments, a NXC circuit may be implemented in either the tx or the rx to reduce near-end crosstalk over the PCIe channel.

FIG. 3B illustrates example waveforms of a signal received on a data line of the PCIe channel. Waveform 302 represents a waveform of a signal received on the data line when no NXC circuit is present. Waveform 304 represents the same waveform after NEXT compensation has been performed for the signal by a 16-tap NXC circuit in which each delay block introduces a 1 UI delay. Waveform 306 represents the waveform after NEXT compensation has instead been performed for the signal by a 32-tap NXC circuit in which each delay block introduces a ½ UI delay. Finally, waveform 308 represents the waveform after NEXT compensation has instead been performed for the signal by a 64-tap NXC circuit in which each delay block introduces a ¼ UI delay. The total compensation period is 16 UI for all three NEXT compensation scenarios. More taps with smaller unit delay generally results in better resolution and cancellation effects. The number of taps used is a design choice and may depend on the length of the NEXT signal (e.g., more taps may be used for longer NEXT signals).

FIG. 3C depicts signal eye heights for each of the scenarios associated with the waveforms of FIG. 3B and FIG. 3D depicts signal eye widths for each of the scenarios. For the particular channel represented in FIG. 3A, the improvement (as shown in FIGS. 3C and 3D) in the signal margin is substantial when the 16-tap NXC circuit is used relative to no NEXT cancellation and further improved with the 32-tap and 64-tap NXC circuits. Other channels may exhibit different levels of improvement with various types of NXC circuits used. In general, NEXT generally has the largest impairment on long and lossy channels, since NEXT generally does not attenuate with channel loss. The higher the channel loss, the more benefit an NXC circuit may provide.

Figure 4:
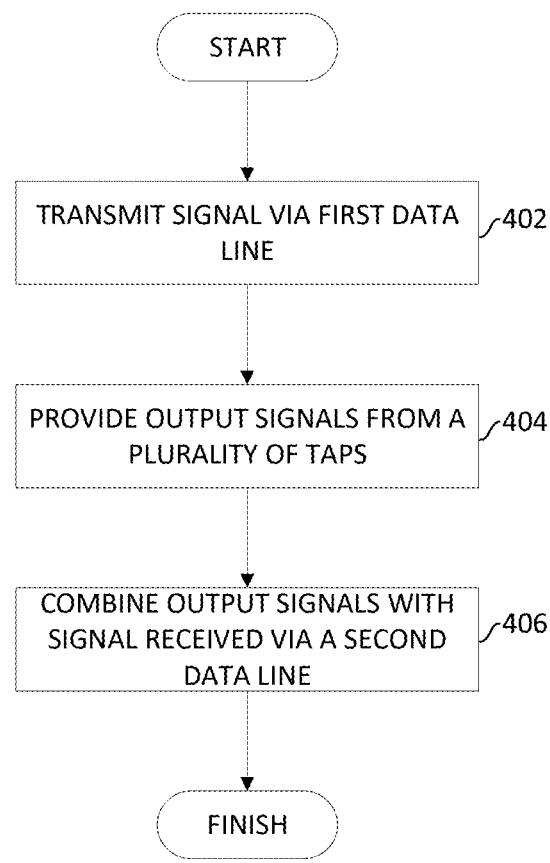
FIG. 4 illustrates a flow for canceling near-end crosstalk in accordance with certain embodiments.

FIG. 4 illustrates a flow for canceling near-end crosstalk in accordance with certain embodiments. At 402, a signal is transmitted via a first data line (e.g., an aggressor data line). At 404, a plurality of output signals are provided from a plurality of taps. The output signals may each be based on the signal transmitted via the first data line. For example, each output may be a scaled and/or delayed version of the signal. At 406, the output signals are combined with a signal received via a second data line (e.g., a victim data line).

Figure 5:
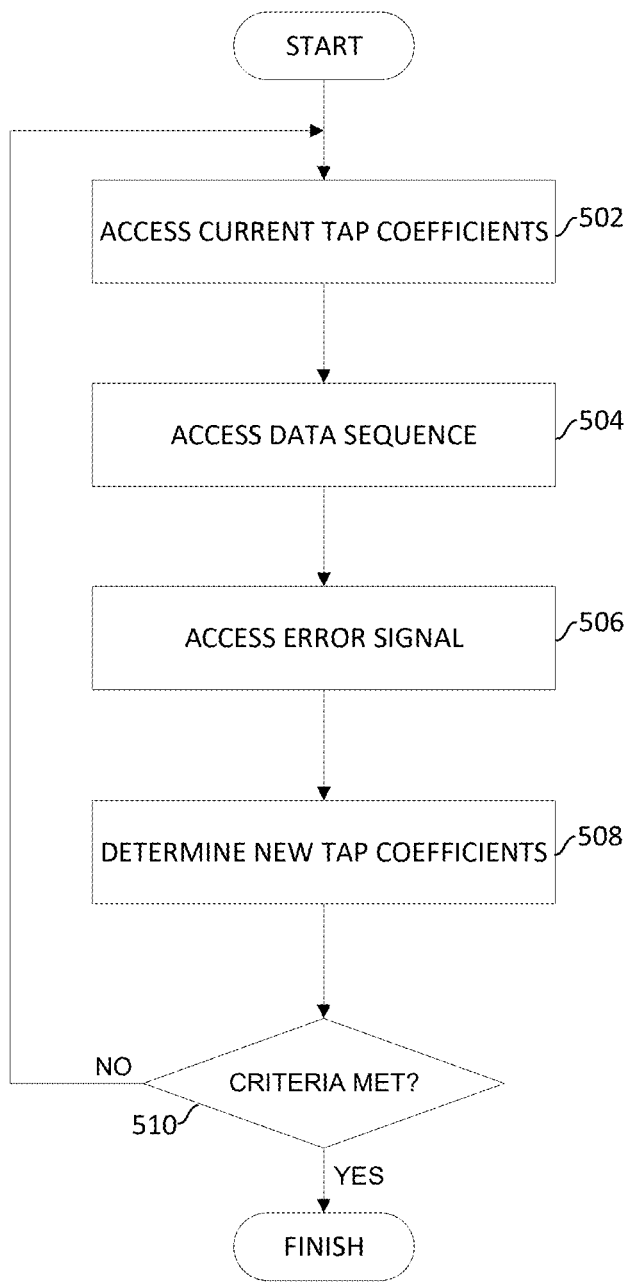
FIG. 5 illustrates a flow for adjusting tap coefficients in accordance with certain embodiments.

FIG. 5 illustrates a flow for adjusting tap coefficients in accordance with certain embodiments. The flow may be performed by any suitable logic, e.g., tap coefficient updater 224. At 502, current tap coefficients are accessed. At 504, a data sequence is accessed (e.g., the data sequence is a data sequence transmitted over an aggressor data line). At 506, an error signal is accessed. At 508, new tap coefficients are determined based on the current tap coefficients, data sequence, and error signal. At 510, if certain criteria are not met (e.g., convergence of the coefficients has been accomplished), the flow returns to 502 for at least one additional update. If the criteria are met, the flow ends.

The crosstalk cancelation systems 100 or 200 (or other crosstalk cancelation system described herein) may be located in any suitable component (or span multiple components) of a computing system. For example, the system may be part of a communications controller, such as an I/O controller, memory controller, storage device controller, a controller of a system memory device, a controller of an I/O device, or other suitable component. The crosstalk cancelation systems may be used with any type of communication channel. For example, the system may be used for a channel between a CPU and a memory device (e.g., a DRAM device, a DIMM, or other suitable form factor), a channel between a CPU and a storage device, a PCIe channel, a USB channel, a channel to communicate via any other suitable protocol, or any other channel between two devices or systems.

Figure 6:
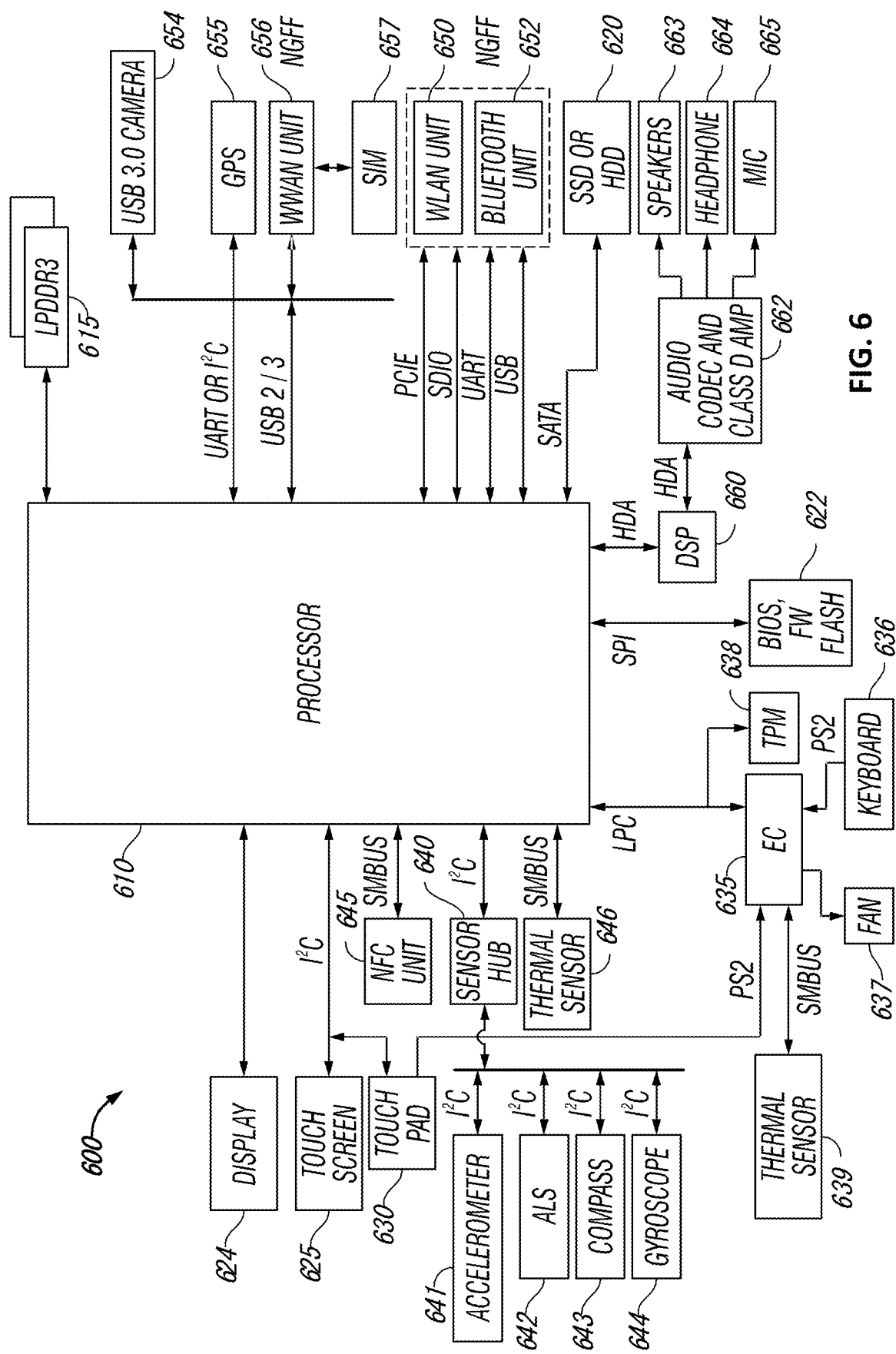
FIG. 6 illustrates a block diagram of components present in a computing system in accordance with various embodiments.
Figure 7:
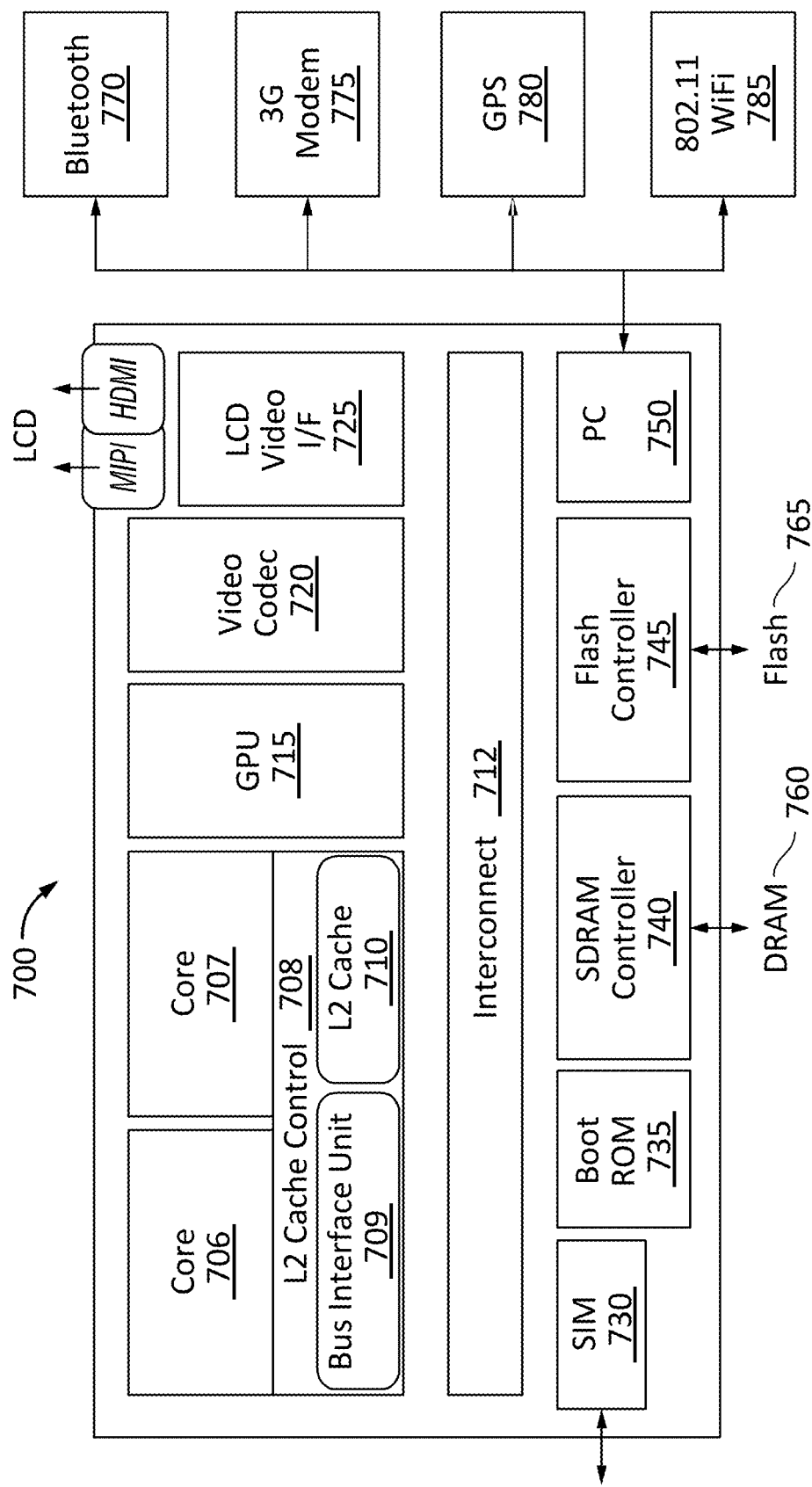
FIG. 7 illustrates a block diagram of another computing system in accordance with various embodiments.

FIGS. 6 and 7 depict example systems in which various embodiments described herein may be implemented. For example, any of the systems depicted (or a component thereof) could implement systems 100 or 200 (or components thereof).

Referring now to FIG. 6, a block diagram of components present in a computer system that may function as either a host device or a peripheral device (or which may include both a host device and one or more peripheral devices) in accordance with certain embodiments is described. As shown in FIG. 6, system 600 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 6 is intended to show a high level view of many components of the computer system. However, it is to be understood that some of the components shown may be omitted, additional components may be present, and different arrangement of the components shown may occur in other implementations. As a result, the disclosure described above may be implemented in any portion of one or more of the interconnects illustrated or described below.

As seen in FIG. 6, a processor 610, in one embodiment, includes a microprocessor, multi-core processor, multi-threaded processor, an ultra low voltage processor, an embedded processor, or other known processing element. In the illustrated implementation, processor 610 acts as a main processing unit and central hub for communication with many of the various components of the system 600. As one example, processor 610 is implemented as a system on a chip (SoC). As a specific illustrative example, processor 610 includes an Intel® Architecture Core™-based processor such as an i3, i5, i7 or another such processor available from Intel Corporation, Santa Clara, CA. However, other low power processors such as those available from Advanced Micro Devices, Inc. (AMD) of Sunnyvale, CA, a MIPS-based design from MIPS Technologies, Inc. of Sunnyvale, CA, an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitecture implementation may vary, but the architectural function of the processor is usually consistent. Certain details regarding the architecture and operation of processor 610 in one implementation will be discussed further below to provide an illustrative example.

Processor 610, in one embodiment, communicates with a system memory 615. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (QDP). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 620 may also couple to processor 610. In various embodiments, to enable a thinner and lighter system design as well as to improve system responsiveness, this mass storage may be implemented via a SSD. However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 6, a flash device 622 may be coupled to processor 610, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 600. Specifically shown in the embodiment of FIG. 6 is a display 624 which may be a high definition LCD or LED panel configured within a lid portion of the chassis. This display panel may also provide for a touch screen 625, e.g., adapted externally over the display panel such that via a user's interaction with this touch screen, user inputs can be provided to the system to enable desired operations, e.g., with regard to the display of information, accessing of information and so forth. In one embodiment, display 624 may be coupled to processor 610 via a display interconnect that can be implemented as a high performance graphics interconnect. Touch screen 625 may be coupled to processor 610 via another interconnect, which in an embodiment can be an I2C interconnect. As further shown in FIG. 6, in addition to touch screen 625, user input by way of touch can also occur via a touch pad 630 which may be configured within the chassis and may also be coupled to the same I2C interconnect as touch screen 625.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080p), be compatible with an embedded display port (eDP), and be a low power panel with panel self refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 610 in different manners. Certain inertial and environmental sensors may couple to processor 610 through a sensor hub 640, e.g., via an I2C interconnect. In the embodiment shown in FIG. 6, these sensors may include an accelerometer 641, an ambient light sensor (ALS) 642, a compass 643 and a gyroscope 644. Other environmental sensors may include one or more thermal sensors 646 which in some embodiments couple to processor 610 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example, with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements. In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

Also seen in FIG. 6, various peripheral devices may couple to processor 610. In the embodiment shown, various components can be coupled through an embedded controller 635. Such components can include a keyboard 636 (e.g., coupled via a PS2 interface), a fan 637, and a thermal sensor 639. In some embodiments, touch pad 630 may also couple to EC 635 via a PS2 interface. In addition, a security processor such as a trusted platform module (TPM) 638 in accordance with the Trusted Computing Group (TCG) TPM Specification Version 1.2, dated Oct. 2, 2003, may also couple to processor 610 via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus (USB) Revision 3.2 Specification (September 2017), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 600 can communicate with external devices in a variety of manners, including wirelessly. In the embodiment shown in FIG. 6, various wireless modules, each of which can correspond to a radio configured for a particular wireless communication protocol, are present. One manner for wireless communication in a short range such as a near field may be via a near field communication (NFC) unit 645 which may communicate, in one embodiment with processor 610 via an SMBus. Note that via this NFC unit 645, devices in close proximity to each other can communicate. For example, a user can enable system 600 to communicate with another portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 6, additional wireless units can include other short range wireless engines including a WLAN unit 650 and a Bluetooth unit 652. Using WLAN unit 650, Wi-Fi™ communications in accordance with a given Institute of Electrical and Electronics Engineers (IEEE) 802.11 standard can be realized, while via Bluetooth unit 652, short range communications via a Bluetooth protocol can occur. These units may communicate with processor 610 via, e.g., a USB link or a universal asynchronous receiver transmitter (UART) link. Or these units may couple to processor 610 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 656 which in turn may couple to a subscriber identity module (SIM) 657. In addition, to enable receipt and use of location information, a GPS module 655 may also be present. Note that in the embodiment shown in FIG. 6, WWAN unit 656 and an integrated capture device such as a camera module 654 may communicate via a given USB protocol such as a USB 2.0 or 3.0 link, or a UART or I2C protocol. Again, the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multi-function device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 660, which may couple to processor 610 via a high definition audio (HDA) link. Similarly, DSP 660 may communicate with an integrated coder/decoder (CODEC) and amplifier 662 that in turn may couple to output speakers 663 which may be implemented within the chassis. Similarly, amplifier and CODEC 662 can be coupled to receive audio inputs from a microphone 665 which in an embodiment can be implemented via dual array microphones (such as a digital microphone array) to provide for high quality audio inputs to enable voice-activated control of various operations within the system. Note also that audio outputs can be provided from amplifier/CODEC 662 to a headphone jack 664. Although shown with these particular components in the embodiment of FIG. 6, understand the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 610 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

Power control in the processor can lead to enhanced power savings. For example, power can be dynamically allocated between cores, individual cores can change frequency/voltage, and multiple deep low power states can be provided to enable very low power consumption. In addition, dynamic control of the cores or independent core portions can provide for reduced power consumption by powering off components when they are not being used.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TxT), and Intel® Manageability Engine Technology along with secure user interfaces such as a secure keyboard and display.

Turning next to FIG. 7, another block diagram for an example computing system that may serve as a host device or peripheral device (or may include both a host device and one or more peripheral devices) in accordance with certain embodiments is shown. As a specific illustrative example, SoC 700 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SoC 700 includes 2 cores-706 and 707. Similar to the discussion above, cores 706 and 707 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 706 and 707 are coupled to cache control 708 that is associated with bus interface unit 709 and L2 cache 710 to communicate with other parts of system 700. Interconnect 712 includes an on-chip interconnect, such as an IOSF, AMBA, or other interconnect discussed above, which potentially implements one or more aspects of the described disclosure.

Interconnect 712 provides communication channels to the other components, such as a Subscriber Identity Module (SIM) 730 to interface with a SIM card, a boot rom 735 to hold boot code for execution by cores 706 and 707 to initialize and boot SoC 700, a SDRAM controller 740 to interface with external memory (e.g. DRAM 760), a flash controller 745 to interface with non-volatile memory (e.g. Flash 765), a peripheral control 750 (e.g. Serial Peripheral Interface) to interface with peripherals, video codecs 720 and Video interface 725 to display and receive input (e.g. touch enabled input), GPU 715 to perform graphics related computations, etc. Any of these interfaces may incorporate aspects of the disclosure described herein.

In addition, the system illustrates peripherals for communication, such as a Bluetooth module 770, 3G modem 775, GPS 780, and WiFi 785. Note as stated above, a UE includes a radio for communication. As a result, these peripheral communication modules are not all required. However, in a UE some form of a radio for external communication is to be included.

Although the drawings depict particular computer systems, the concepts of various embodiments are applicable to any suitable integrated circuits and other logic devices. Examples of devices in which teachings of the present disclosure may be used include desktop computer systems, server computer systems, storage systems, handheld devices, tablets, other thin notebooks, systems on a chip (SOC) devices, and embedded applications. Some examples of handheld devices include cellular phones, digital cameras, media players, personal digital assistants (PDAs), and handheld PCs. Embedded applications may include, e.g., a microcontroller, a digital signal processor (DSP), an SOC, a network computer (NetPC), a set-top box, a network hub, a wide area network (WAN) switch, or any other system that can perform the functions and operations taught below. Various embodiments of the present disclosure may be used in any suitable computing environment, such as a personal computing device, a server, a mainframe, a cloud computing service provider infrastructure, a datacenter, a communications service provider infrastructure (e.g., one or more portions of an Evolved Packet Core), or other environment comprising a group of computing devices.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

A module as used herein or as depicted in the FIGs. refers to any combination of hardware, software, and/or firmware. As an example, a module includes hardware, such as a micro-controller, associated with a non-transitory medium to store code adapted to be executed by the micro-controller.

Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the flows described or functionality of the various components of the FIGs., subcomponents thereof, or other entity or component described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Example 1 includes an apparatus comprising a crosstalk cancelation circuit comprising a plurality of taps to output signals based on a signal transmitted via a first data line; and a summation circuit to combine a signal received by a second data line with the signals output by the plurality of taps to reduce near-end crosstalk present in the signal received by the second data line.

Example 2 includes the subject matter of Example 1, and wherein the plurality of taps comprise a plurality of delay blocks coupled to the first data line, wherein an output of a delay block of the plurality of delay blocks is coupled to an input of a gain block of a plurality of gain blocks of the plurality of taps.

Example 3 includes the subject matter of any of Examples 1 and 2, and wherein the plurality of delay blocks are each to provide a common amount of delay.

Example 4 includes the subject matter of any of Examples 1-3, and wherein the common amount of delay is one unit interval.

Example 5 includes the subject matter of any of Examples 1-4, and wherein the common amount of delay is a fraction of a unit interval.

Example 6 includes the subject matter of any of Examples 1-5, and wherein a first gain block of the plurality of gain blocks is coupled to the first data line without a delay and the remainder of the plurality of gain blocks are each coupled to the first data line through one or more of the plurality of delay blocks.

Example 7 includes the subject matter of any of Examples 1-6, and further including a circuit to measure an error signal based on a difference between an output of the summation circuit and an expected output.

Example 8 includes the subject matter of any of Examples 1-7, and further including a circuit to update coefficients of the plurality of taps based on the error signal, current values of the coefficients, and values of a sequence transmitted by the first data line.

Example 9 includes the subject matter of any of Examples 1-8, and further including a tap coefficient updater to periodically update a plurality of coefficients of the taps until an update criteria is satisfied.

Example 10 includes the subject matter of any of Examples 1-9, and further including a second plurality of taps to output signals based on a signal transmitted via a third data line, and wherein the summation circuit is to combine the signal received by the second data line, the signals output by the plurality of taps, and the signals output by the second plurality of taps.

Example 11 includes a system comprising a processor core; and a crosstalk cancelation circuit comprising a plurality of taps to output signals based on a signal transmitted via a first data line; and a summation circuit to combine a signal received by a second data line with the signals output by the plurality of taps to reduce near-end crosstalk present in the signal received by the second data line.

Example 12 includes the subject matter of Example 11, and wherein the plurality of taps comprise a plurality of delay blocks coupled to the first data line, wherein an output of a delay block of the plurality of delay blocks is coupled to an input of a gain block of a plurality of gain blocks of the plurality of taps.

Example 13 includes the subject matter of any of Examples 11 and 12, and wherein a first gain block of the plurality of gain blocks is coupled to the first data line without a delay and the remainder of the plurality of gain blocks are each coupled to the first data line through one or more of the plurality of delay blocks.

Example 14 includes the subject matter of any of Examples 11-13, and further including a tap coefficient updater to periodically update a plurality of coefficients of the taps until an update criteria is satisfied.

Example 15 includes the subject matter of any of Examples 11-14, and further including a battery communicatively coupled to the processor core, a display communicatively coupled to the processor core, or a network interface communicatively coupled to the processor core.

Example 16 includes a method comprising transmitting a signal via a first data line; providing, by a plurality of taps, output signals based on the signal transmitted via the first data line; and combining the output signals provided by the plurality of taps with a signal received by a second data line to reduce near-end crosstalk present in the signal received by the second data line.

Example 17 includes the subject matter of any of Examples 11-16, and wherein the plurality of taps comprise a plurality of delay blocks coupled to the first data line, wherein an output of a delay block of the plurality of delay blocks is coupled to an input of a gain block of a plurality of gain blocks of the plurality of taps.

Example 18 includes the subject matter of any of Examples 11-17, and wherein a first gain block of the plurality of gain blocks is coupled to the first data line without a delay and the remainder of the plurality of gain blocks are each coupled to the first data line through one or more of the plurality of delay blocks.

Example 19 includes the subject matter of any of Examples 11-18, and further including periodically updating a plurality of coefficients of the taps until an update criteria is satisfied.

Example 20 includes the subject matter of any of Examples 11-19, and wherein the updating is based on a least mean square of an error signal.

Example 21 includes the subject matter of any of Examples 11-20, and wherein the plurality of delay blocks are each to provide a common amount of delay.

Example 22 includes the subject matter of any of Examples 11-21, and wherein the common amount of delay is one unit interval.

Example 23 includes the subject matter of any of Examples 11-22, and wherein the common amount of delay is a fraction of a unit interval.

Example 24 includes the subject matter of any of Examples 11-23, and further comprising measuring an error signal based on a difference between an output of the summation circuit and an expected output.

Example 25 includes the subject matter of any of Examples 11-24, and further comprising updating coefficients of the plurality of taps based on the error signal, current values of the coefficients, and values of a sequence transmitted by the first data line.

Example 26 includes the subject matter of any of Examples 11-25, and further comprising outputting, by a second plurality of taps, signals based on a signal transmitted via a third data line, and combining, by a summation circuit, the signal received by the second data line, the signals output by the plurality of taps, and the signals output by the second plurality of taps.

Example 27 includes a system comprising one or more means to perform any of the operations of Examples 16-26.

Example 28 includes one or more non-transitory computer readable media when executed to perform any of the operations of Examples 16-26.

What is claimed is:

1. An apparatus comprising:
   a crosstalk cancelation circuit comprising:
      a plurality of taps to output signals based on a signal transmitted via a first data line, wherein the plurality of taps comprise a plurality of delay blocks coupled to the first data line, wherein an output of a delay block of the plurality of delay blocks is coupled to an input of a gain block of a plurality of gain blocks of the plurality of taps; and
      a summation circuit to combine a signal received by a second data line with the signals output by the plurality of taps to reduce near-end crosstalk present in the signal received by the second data line.

2. The apparatus of claim 1, wherein the plurality of delay blocks are each to provide a common amount of delay.

3. The apparatus of claim 2, wherein the common amount of delay is one unit interval.

4. The apparatus of claim 2, wherein the common amount of delay is a fraction of a unit interval.

5. The apparatus of claim 1, wherein a first gain block of the plurality of gain blocks is coupled to the first data line without a delay block between the first gain block and the first data line and the remainder of the plurality of gain blocks are each coupled to the first data line through one or more of the plurality of delay blocks.

6. The apparatus of claim 1, further comprising a circuit to measure an error signal based on a difference between an output of the summation circuit and an expected output.

7. The apparatus of claim 6, further comprising a circuit to update coefficients of the plurality of taps based on the error signal, current values of the coefficients, and values of a sequence transmitted by the first data line.

8. The apparatus of claim 1, further comprising a tap coefficient updater to periodically update a plurality of coefficients of the taps until an update criteria is satisfied.

9. The apparatus of claim 1, further comprising a second plurality of taps to output signals based on a signal transmitted via a third data line, and wherein the summation circuit is to combine the signal received by the second data line, the signals output by the plurality of taps, and the signals output by the second plurality of taps.

10. A system comprising:
    a processor core; and
    a crosstalk cancelation circuit comprising:
       a plurality of taps to output signals based on a signal transmitted via a first data line, wherein the plurality of taps comprise a plurality of delay blocks coupled to the first data line, wherein an output of a delay block of the plurality of delay blocks is coupled to an input of a gain block of a plurality of gain blocks of the plurality of taps; and
       a summation circuit to combine a signal received by a second data line with the signals output by the plurality of taps to reduce near-end crosstalk present in the signal received by the second data line.

11. The system of claim 10, wherein a first gain block of the plurality of gain blocks is coupled to the first data line without a delay, wherein a second gain block of the plurality of gain blocks is coupled to the first data line through a first delay block of the plurality of delay blocks, wherein a third gain block of the plurality of gain blocks is coupled to the first data line through the first delay block and a second delay block of the plurality of delay blocks, wherein the summation circuit combines signals output by the first gain block, second gain block, and third gain block.

12. The system of claim 10, further comprising a tap coefficient updater to periodically update a plurality of coefficients of the taps until an update criteria is satisfied.

13. The system of claim 10, further comprising a battery communicatively coupled to the processor core, a display communicatively coupled to the processor core, or a network interface communicatively coupled to the processor core.

14. A method comprising:
    generating, by a first driver comprising a digital-to-analog converter, a waveform based on a digital sequence provided by a transmitter logic;
    transmitting, by a second driver, a signal via a first data line, wherein the signal via the first data line is based on the waveform;
    providing, by a plurality of taps, output signals based on the waveform; and
    combining the output signals provided by the plurality of taps with a signal received by a second data line to reduce near-end crosstalk present in the signal received by the second data line, wherein the combining of the output signals provided by the taps with the signal received by the second data line is a summation of the output signals provided by the taps, each output signal weighted with an individual coefficient.

15. The method of claim 14, wherein the plurality of taps comprise a plurality of delay blocks coupled to the first data line, wherein an output of a delay block of the plurality of delay blocks is coupled to an input of a gain block of a plurality of gain blocks of the plurality of taps.

16. The method of claim 15, wherein a first gain block of the plurality of gain blocks is coupled to the first data line without a delay and the remainder of the plurality of gain blocks are each coupled to the first data line through one or more of the plurality of delay blocks.

17. The method of claim 14, further comprising periodically updating a plurality of coefficients of the taps until an update criteria is satisfied.

* * * * *